No. 897,721. PATENTED SEPT. 1, 1908.
M. DAVIS.
STOVE IMPLEMENT.
APPLICATION FILED FEB. 21, 1908.
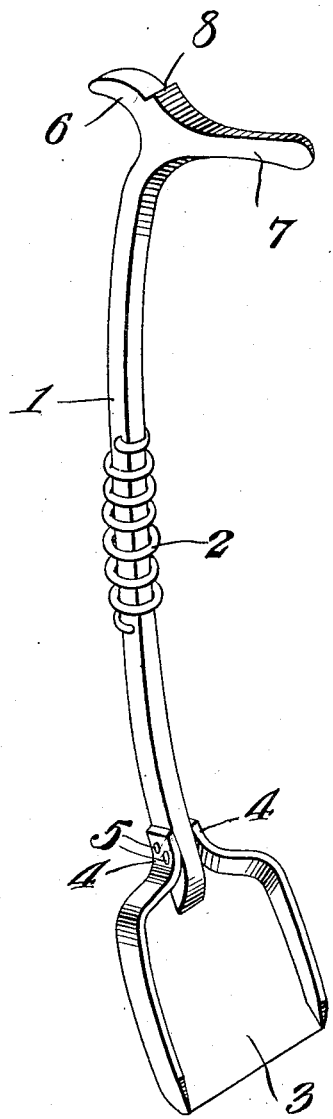
Witnesses:—
Joe. P. Wahler,
C. C. Hines.
Inventor,
Myer Davis.
By Victor J. Evans,
Attorney.

UNITED STATES PATENT OFFICE.

MYER DAVIS, OF TRENTON, NEW JERSEY.

STOVE IMPLEMENT.

No. 897,721.   Specification of Letters Patent.   Patented Sept. 1, 1908.

Application filed February 21, 1908. Serial No. 417,070.

*To all whom it may concern:*

Be it known that I, MYER DAVIS, a citizen of the United States, residing at Trenton, in the county of Mercer and State of New Jersey, have invented new and useful Improvements in Stove Implements, of which the following is a specification.

This invention relates to improvements in stove implements, the main object of the invention being to provide in a single implement a lid-lifter, poker and shovel, and to so construct the parts of the device as to secure a combinative action of the lifting and poking portions in the respective operations of applying or removing a lid and poking or stirring the fire.

The invention consists of the features of construction hereinafter fully described and claimed, reference being had to the accompanying drawing, showing a perspective view of the improved implement.

The device comprises a handle or shank 1, which may be either angular or round in cross-section, but which is preferably longitudinally curved, as shown, to dispose the operating portions thereof in relative position to effectively perform their respective services and to admit of the convenient manipulation of the device. The said shank or handle may be provided at an intermediate point with a grip 2 preferably formed of coiled wire, spaced therefrom so as to remain cool and prevent burning of the hand of the operator.

Secured to one end of the shank or handle is a shovel blade 3, the side walls of which have converging rear ends 4 spaced to form an intermediate passage for the end of the shank, which projects over upon the bottom of the blade and is secured to the said rear ends of the side walls by rivets or other suitable fastenings 5. Integral with the opposite end of the shank 1 is a lifting hook or tongue 6, which projects from the rear side of said shank, and also integral with said end of the shank is an arm 7 projecting forwardly on the side diametrically opposite the hook, which arm serves the function of a poker. It will be observed that the lid-lifting hook or tongue 6 and the poker arm 7 constitute the opposite portions of the cross-bar of a T-shaped end of the handle, which is thickened in line with the handle to provide a shoulder 8 at the base of the convex face of the hook to secure a firm engagement between the hook and the lid with which it is engaged.

The curved form of the handle bar 1 disposes all three of the parts of the tool in position for effective manipulation and operation, the mode of use of the device being apparent. It will be understood that when the tongue or hook 6 is applied to the receiving socket in a lid, the shoulder 8 as well as the arm 7 will overlie and bear upon the lid, thus supporting the lid firmly in position upon the tool. The arm 7 may be conveniently inserted between the bars of a grate for shaking down the ashes, or the entire T-shaped end of the tool inserted into the bed of fuel or a surrounding body of ashes and reciprocated or rotated, whereby both the hook and arm will operate to loosen up the coals and ashes for the purpose of promoting combustion or dislodging the ashes from the fire-box.

If desired, the shovel blade 3 may be dispensed with, but is preferably employed as its use increases the utility of the tool from a practical standpoint.

The advantages of the construction and arrangement of the lifting and poking portions will be readily understood, and it will be seen also that the invention provides a combination tool which may be easily and inexpensively manufactured.

Having thus fully described the invention, what is claimed as new is:—

1. A stove implement comprising a handle bar or shank having a segmentally-curved T-shaped portion at one end enlarged in line with the shank, one of the arms of said portion being formed to provide a lifting hook projecting beyond one side of the shank and the other a poker blade projecting beyond the opposite side of the shank, the said arms having their outer surfaces disposed substantially in the same plane and the enlarged portion being formed to provide a straight transverse shoulder at the base of the convex face of the hook.

2. A stove implement comprising a handle bar or shank provided at one end with a segmentally-curved T-shaped portion, one of the arms of said T-shaped portion being formed to provide a lifting hook projecting beyond one side of the shank, and the other arm of said T-shaped portion being formed to provide a poker blade projecting beyond the opposite side of the shank and disposed in longitudinal alinement with said hook, the said arms having their outer surfaces disposed substantially in the same plane, and the hook having its outer convex surface terminating in advance of the line of the shank and the outer face of the center of said T-shaped portion being curved outwardly on an arc terminating beyond the said convex face of the hook to provide a straight transverse shoulder at their points of intersection, said shoulder being located in the direction of the hook beyond the plane of the shank.

In testimony whereof I affix my signature in presence of two witnesses.

MYER DAVIS.

Witnesses:
MANFRED NAAR,
A. E. MILLER.